United States Patent [19]

Kuwata et al.

[11] Patent Number: 4,834,994

[45] Date of Patent: May 30, 1989

[54] METHOD FOR REMOVING β-LACTOGLOBULIN FROM BOVINE MILK WHEY

[75] Inventors: Tamotsu Kuwata, Saitama; Hideo Ohtomo, Tokyo, both of Japan

[73] Assignee: Meiji Milk Products Company Limited, Tokyo, Japan

[21] Appl. No.: 134,147

[22] Filed: Dec. 17, 1987

[51] Int. Cl.$^4$ .................... A23C 9/146; A23C 21/00
[52] U.S. Cl. .................... 426/271; 426/491; 426/495; 426/583; 426/656
[58] Field of Search ............. 426/656, 271, 41, 580, 426/34, 583, 491, 495

[56] References Cited

FOREIGN PATENT DOCUMENTS 0209414 1/1987 European Pat. Off. ............ 426/271
2452881 12/1980 France ................................ 426/271

OTHER PUBLICATIONS

Hidalgo et al., "Selective Precipitation of Whey Proteins with Carboxymethylcellulose", Dept. Food Science & Nutrition, J. of Dairy Science, vol. 54, No. 9, pp. 1270–1274.

Pearce, "Thermal Separation of β-Lactoglobulin and α-Lactalbumin in Bovine Cheddar Cheese Whey", Australian Journal of Dairy Tech., Dec. 1983, pp. 144–148.

Melachouris, "Interactions of β-Lactoglobulin with Polyphosphates", J. Agr. Food Chem., vol. 20, No. 4, 1972, pp. 798–802.

Skudder, "Recovery and Fractionation of Proteins from Cheese Whey Using a Porous Silica-Based Ion--Exchange Medium", Chemistry & Industry, No. 7, Nov. 1983, pp. 810–814.

Primary Examiner—Marianne Cintins
Attorney, Agent, or Firm—Browdy and Neimark

[57] ABSTRACT

There is described a method for removing β-lactoglobulin from bovine milk whey, in which bovine milk whey having been demineralized by 60 to 90% by weight is treated so as to have a pH value of from 4.3 to 4.6 and a protein concentration of from 0.5 to 1.5% by weight, and is then brought into contact with a cation exchange cellulose.

4 Claims, 7 Drawing Sheets

INFLUENCE OF pH ON THE RATIO OF
UNADSORBED α-La AND β-Lg (BATCH METHOD)

INFLUENCE OF THE PROTEIN CONCENTRATION ON THE ELUTION BEHAVIOR OF UNADSORBED α-La AND β-Lg (BATCH METHOD)

INFLUENCE OF ULTRAFILTRATED RENNET WHEY PERMEATE POWDER ON THE ELUTION BEHAVIOR OF UNADSORBED α-La AND β-Lg (BATCH METHOD)

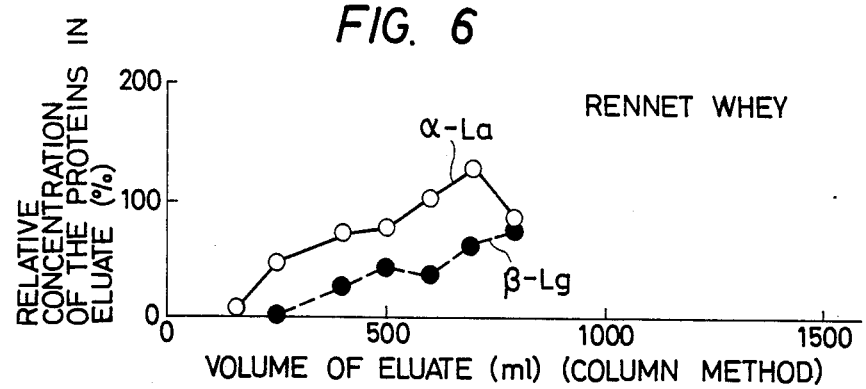
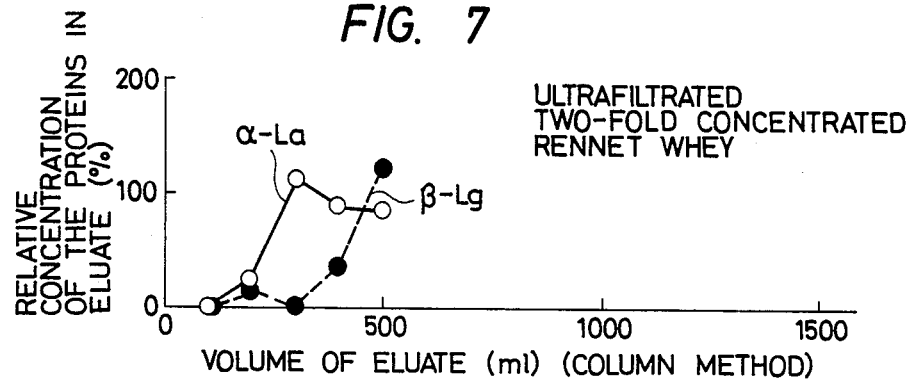
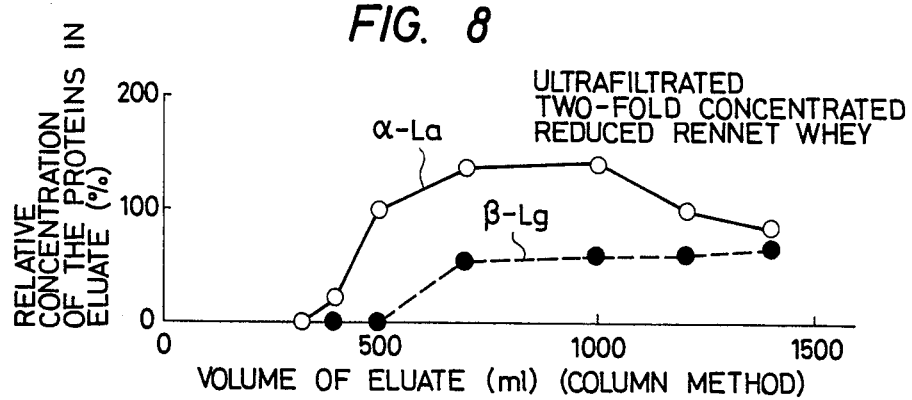

ELUTION BEHAVIOR OF UNADSORBED α-La AND β-Lg OF GOADA CHEESE WHEY (COLUMN METHOD)

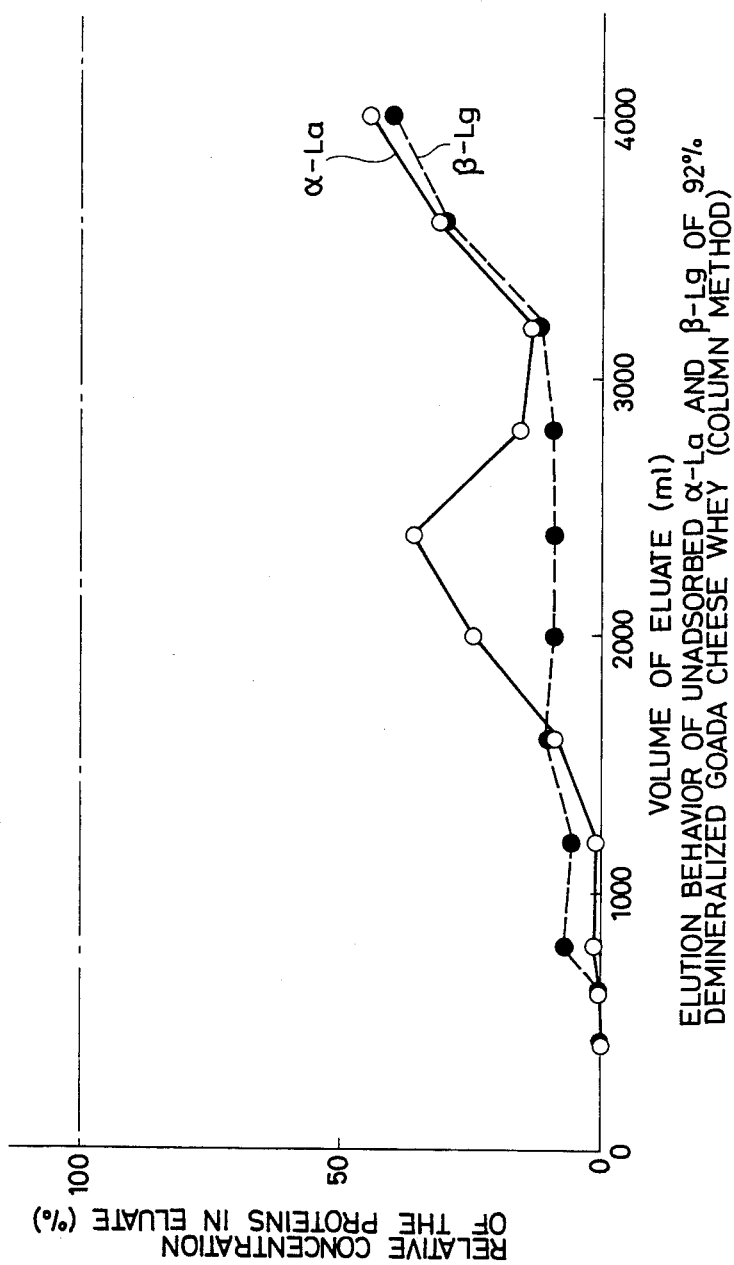

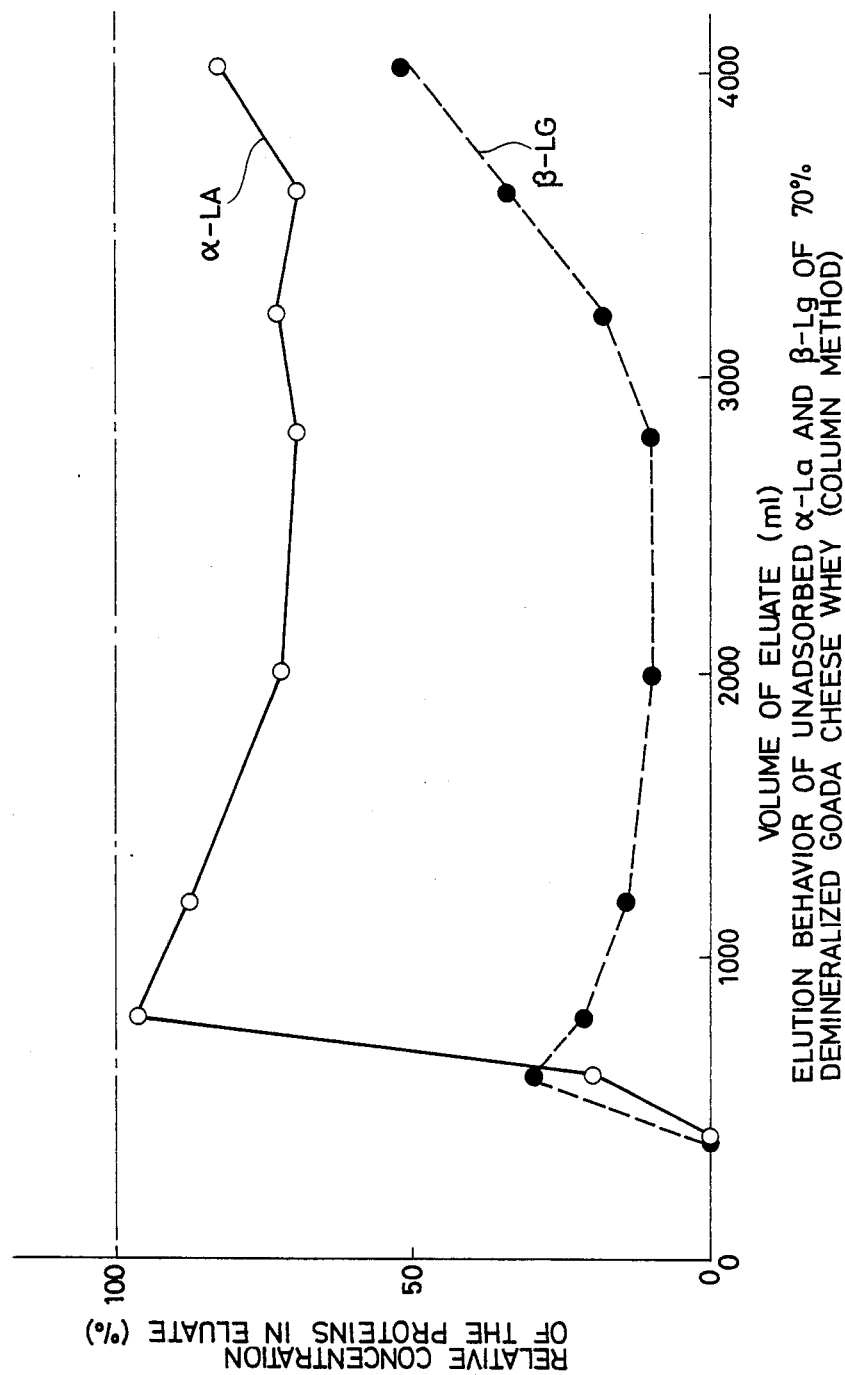

METHOD FOR REMOVING β-LACTOGLOBULIN FROM BOVINE MILK WHEY

FIELD OF THE INVENTION

The present invention relates to a method for producing an improved bovine milk whey. Particularly, it relates to a method for producing a bovine milk whey which has reduced amount of β-lactoglobulin and, more particularly, to a method for removing β-lactoglobulin from bovine milk whey by means of adsorption on a cation exchange cellulose, i.e., a cellulose cation exchange.

DESCRIPTION OF PRIOR ART

Upon production of cheese, most of water-soluble components contained in bovine milk, except fat and casein, transfer to the resulting milk whey. Lactose abundantly contained in the milk whey can be easily recovered therefrom by crystallization. Such a recovered lactose has been utilized for foods and chemicals.

However, the remaining milk whey obtained after the removal of lactose has been used only as a material for foods, in most cases, as a low-lactose whey podwer, and in some cases, as a demineralized low-lactose whey powder or ultrafiltrated whey protein concentrate (WPC).

Milk serum proteins have not been isolated and utilized individually on a commercial scale, except such special cases as the selective isolation of lactoferrin from cow's milk whey. It is the present state of the art that proteins contained in bovine milk whey have not been utilized in a highly effective manner, so as to make the best of the characteristics of various proteins contained therein.

One reason therefor is that the milk serum proteins contained in bovine milk whey include a large quantity of β-lactoglobulin (which may hereinafter be referred to as "β-Lg"). β-Lg is a protein which is not present in human milk. It is therefore disadvantageous to use milk serum proteins containing β-Lg as a protein source for, e.g., modified milk powders (infant formulas) for feeding infants since β-Lg may act as an allergen for some babies, even though the use of the proteins is advantageous from the viewpoint of the improvement of efficiency in the utilization of proteins by infants.

In general, the proteins of human milk and cow's milk are much different in the content of caseins; the former contains 2.5 g/l and the latter 27.3 g/l.

On the other hand, the contents of milk serum proteins, other that caseins, are not so much different (6.4 g/l in human milk and 5.8 g/l in cow's milk). The protein composition of human and cow's milks, the comparison thereof showing the difference in character between both, is shown in Table 1.

TABLE 1

| Character of Proteins in Human and Cow's Milks* | | |
|---|---|---|
| | Human Milk (g/l) | Cow's Milk (g/l) |
| Casein | 2.5 | 27.3 |
| Milk Serum Proteins | 6.4 | 5.8 |
| α-Lactalbumin | 2.6 | 1.1 |
| Lactoferrin | 1.7 | Trace |
| β-Lactoglobulin | — | 3.6 |
| Lysozyme | 0.5 | Trace |
| Serum Alubumin | 0.5 | 0.4 |
| Immunoglobulin A | 1.0 | 0.03 |
| Immunoglobulin G | 0.03 | 0.6 |

TABLE 1-continued

| Character of Proteins in Human and Cow's Milks* | | |
|---|---|---|
| | Human Milk (g/l) | Cow's Milk (g/l) |
| Immunoglobulin M | 0.02 | 0.03 |

[Note]
*According to Hambraeus et al.

As shown in Table 1, β-Lg is not contained in human milk, whereas cow's milk contains β-Lg at a concentration as high as 3.6 g/l.

In the production of modified milk powders for feeding infants, there have been used casein-free wheys or whey protein concentrates, in order to make the composition of the milk powders as closer as possible to that of human milk. Although the content ratio of casein and milk serum proteins contained in such modified milk powders is closely similar to that in human milk, there still remains the problem that the kinds of the milk serum proteins are different.

If β-Lg contained in cow's milk can be selectively removed, the composition of milk serum proteins can be rendered more similar to that of human milk. In addition to this, it can be expected that the allergy-inducing properties of the milk serum proteins will be weakened.

Various attempts have been made to isolate or remove β-Lg from milk whey. Known methods and their problems are as follows.

1. Coprecipitation method using polymeric polyelectrolytes [J. Hidalgo et al., J. Dairy Sci., 54, 1270 (1970) and N. Melachouris, J. Agr. Food Chem., 20, 798 (1972)]

In this method, β-Lg is removed by allowing it to coprecipitate with polymeric polyelectrolytes through adjustment of the pH and the concentration of polymeric polyelectrolytes added, thereby causing no reactions with α-lactalubumin (hereinafter referred to as "α-La").

This method suffers from the disadvantage that a trace amount of polymeric polyelectrolytes used for the coprecipitation remains in the β-Lg free whey obtained.

2. Thermal separation method [R. J. Pearce, Aust. J. Dairy Technol., 38, 144 (1983)]

This method utilizes the phenomenon that, α-La coagulates more readily than β-Lg when heated, e.g., at a temperature of 55° C. or above and at a pH in the range of from 4.2 to 4.6.

In this method, however, the separation of α-La and β-Lg can be effected insufficiently, and the solubility of the resulting milk whey proteins may become lower because of denaturation which may be caused by the heating treatment. In addition, the β-Lg recovered by this method is inferior in such functional properties as solubitility, foaming properties, gelling properties, etc., and therefore has a limited application.

3. Ion exchange chromatography [P. J. Skudder, Chemistry and Industry J., 7, 810 (1983)]

Like the method of the present invention, a silica-based diethylaminoethyl ion exchanger (Spherosil QMA manufactured by Rhone-Poulene) is used in this method. However, the ion exchanger is not only expensive but also incapable of effecting the separation to a sufficient degree.

BRIEF SUMMARY OF THE INVENTION

The present invention relates to a method for effectively removing β-Lg from bovine milk whey.

There is provided by the present invention a method for removing β-Lg from bovine milk whey, which comprises adjusting milk whey's pH value, demineralization rate and protein concentration to 4.3 to 4.6, 60 to 90% by ash weight (ash content) and 0.5 to 1.5% by weight, respectively, and then making the resulting milk whey contact a cation exchange cellulose.

Bovine milk whey from which β-Lg is to be removed by the method of the present invention is selected from the group consisting of sweet wheys, acid wheys, whey powders, and whey protein concentrates, the whey powders and whey protein concentrates being produced from the sweet or acid wheys.

In the method of the present invention, β-Lg will be adsorbed on a cation exchange cellulose, and the adsorbed β-Lg may be eluted by an alkaline solution.

BRIEF DESCRIPTION OF THE DRAWINGS

FIG. 6 is a graph showing the elution curves of unadsorbed α-La and β-Lg obtained when rennet whey was passed through a cation exchange cellulose column in Test Example 4. FIG. 7 is a graph showing the elution curves of unadsorbed α-La and β-Lg in the case where the ultrafiltrated two-fold concentrated rennet whey was passed through a cation exchange cellulose column in Test Example 4. FIG. 8 is a graph showing the elution curves of unadsorbed α-La and β-Lg in the case where the ultrafiltrated two-fold concentrated reduced rennet whey was passed through a cation exchange cellulose column in Test Example 4. FIG. 10 is a graph showing the elution behavior of unadsorbed α-La and β-Lg of the 92% demineralized Goada cheese whey in Test Example 5. FIG. 11 is a graph showing the elution behavior of unadsorbed α-La and β-Lg of the 70% demineralized Goada cheese whey in Test Example 5.

DETAILED DESCRIPTION OF PREFERRED EMBODIMENTS

Figure 1:
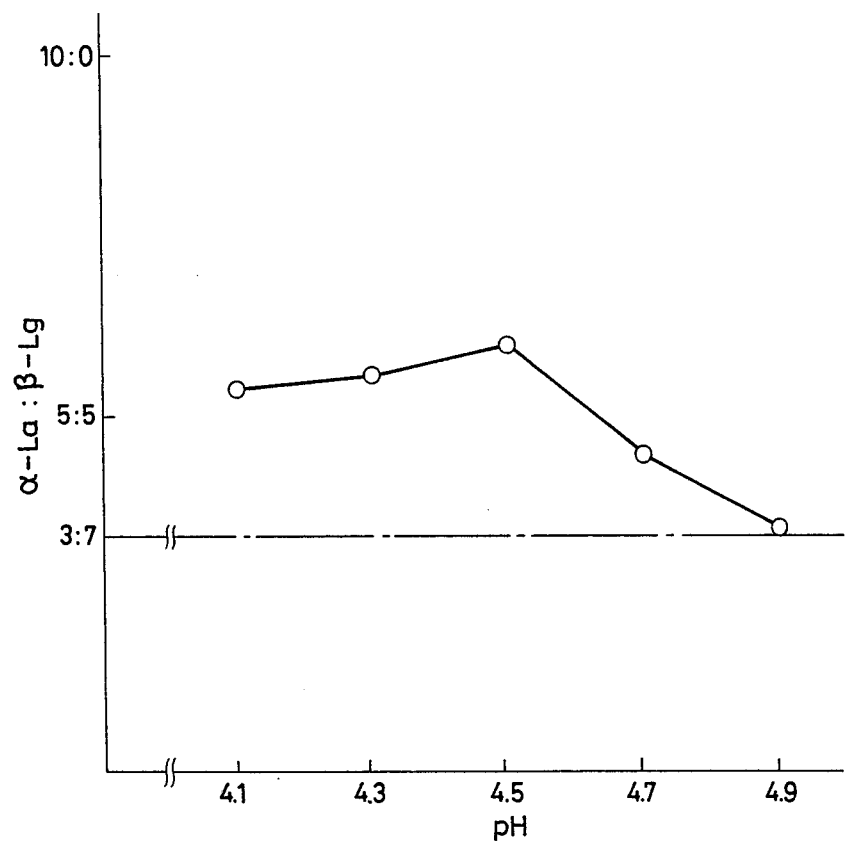
FIG. 1 is a graph showing ratio of unadsorbed α-La and β-Lg in the pH range of from 4.1 to 4.9, which was obtained in Test Example 1.

In the present invention, bovine milk whey is treated so as to have a pH value of from 4.3 to 4.6, a demineralization rate of from 60 to 90% by weight (ash content) and a protein concentration of from 0.5 to 1.5% by weight, and the thus treated milk whey is then brought into contact with a cation exchange cellulose to selectively remove β-Lg alone from the whey, the β-Lg being adsorbed on a cation exchange cellulose.

In order to effect the selective adsorption of β-Lg on the cation exchange cellulose, it is highly important for bovine milk whey to have a pH value of from 4.3 to 4.6, a demineralization rate of from 60 to 90% by weiht (ash content) and a protein concentration of from 0.5 to 1.5% by weight. If these conditions are not fulfilled, the removal by adsorption of β-Lg will become lower, and hence the object of the present invention will not be attained. The cation exchange cellulose to be used in the present invention is one type of cellulose ion exchangers, and is prepared by introducing such dissociative cation-exchange groups as carboxymethyl (CM) groups, sulfopropyl (SP) groups, or carboxyl groups, etc. into cellulose molecules. The cation exchange celluloses to be used in the present invention include carboxymethyl cellulose (CMC), sulfopropyl cellulose (SPC), carboxy cellulose, and the like. In general, they are available on the market, and commercial cation exchange celluloses may be used.

In the method of the present invention, the cation exchange cellulose (hereinafter referred to as CEC) can be used either by a column method or by a batch method, in the same manner as in ordinary ion exchange resins. A continuous method can be more advantageous than a batch method with respect to the efficiency of operation.

In the case where a column method is employed, β-Lg can be adsorbed and removed by simply passing the cow's milk whey, whose pH value has been adjusted to 4.3 to 4.6, demineralization rate to 60 to 90% by weight (ash content) and protein concentration to 0.5 to 1.5% by weight, through the CEC column. The adsorbed β-Lg can be eluted by passing a solution of an alkali, such as sodium hydroxide and potassium hydroxide, through the column. The washed column can be used repeatedly for treating cow's milk whey.

The present invention will further be illustrated by way of examples.

In the following test examples, the two major proteins contained in cow's milk whey, namely α-La and β-Lg, were monitored. Serum albumin and immunoglobulins were neglected since, as already known, the pore size of CEC is too small to adsorb the large molecules of serum albumin or immunoglobulins and hence CEC is hardly capable of adsorbing them. The samples used in the test examples had the compositions shown in Table 2.

TABLE 2

| | Rennet Whey | WPI | Ultrafiltrated Rennet Whey Permeate Powder | Ultrafiltrated Two-Fold Concentrated Rennet Whey | Ultrafiltrated Two-Fold Concentrated Reduced Rennet Whey | Goada Cheese Whey | 92% Demineralized Goada Cheese Whey | 70% Demineralized Goada Cheese Whey |
|---|---|---|---|---|---|---|---|---|
| Protein (%) | 0.86 | 93.25 | 3.74 | 1.52 | 0.76 | 0.85 | 0.82 | 0.87 |
| Total Solid Content (%) | 6.55 | 95.98 | 95.70 | 7.51 | 3.76 | 6.96 | 6.25 | 6.52 |

TABLE 2-continued

|  | Rennet Whey | WPI | Ultrafiltrated Rennet Whey Permeate Powder | Ultrafiltrated Two-Fold Concentrated Rennet Whey | Ultrafiltrated Two-Fold Concentrated Reduced Rennet Whey | Goada Cheese Whey | 92% Demineralized Goada Cheese Whey | 70% Demineralized Goada Cheese Whey |
|---|---|---|---|---|---|---|---|---|
| Ash (%) | 0.59 | 1.71 | 8.66 | 0.58 | 0.29 | 0.51 | 0.04 | 0.16 |
| Na (mg %) | 58 | 500 | 695 | 66 | 33 | 67 | 12 | 22 |
| K (mg %) | 158 | 124 | 2313 | 144 | 72 | 166 | 1.1 | 43 |
| Ca (mg %) | 35 | 90 | 537 | 35 | 18 | 35 | 1.1 | 22 |
| Mg (mg %) | 9.2 | 8 | 126 | 9.6 | 4.8 | 9 | 0.4 | 6.6 |
| Cl (mg %) | 179 | Trace | 2005 | 204 | 102 | 207 | 4.1 | 2.2 |
| P (mg %) | — | 26 | 706 | — | — | — | — | — |
| $\alpha$-La:$\beta$-Lg | 30:70 | 32:68 | 30:70 | 30:70 | 30:70 | 26:74 | 25:75 | 26:74 |

TEST EXAMPLE 1 (Test on optimum pH)

To 20 ml of rennet whey containing $\alpha$-La and $\beta$-Lg at a ratio, by weight, of ca. 30:70 was added 5 ml of CMC (CM-Cellulofine CH manufactured by Chisso Corp.; CMC's used in other Test Examples and Example described hereinafter were the same product). While stirring, 2N HCl was added thereto to adjust its pH to a prescribed value. The resulting mixture was filtered by using Toyo Filter Paper No. 2, and unadsorbed proteins contained in the filtrate were analyzed by high performance gel filtration liquid chromatography, using TSK 2000 SW column manufactured by Toyo Soda Manufacturing Co., Ltd.

There was obtained an elution curve shown in FIG. 1. As shown in FIG. 1, the maximum ratio of unadsorbed $\alpha$-La to unadsorbed $\beta$-Lg (this ratio and other ratios described hereinbelow are based on weight) is attained at pH 4.5, at which the ratio $\alpha$-La:$\beta$-Lg was about 61:39. Both $\alpha$-La and $\beta$-Lg were adsorbed in large quantities below pH 4.1 and both of them adsorbed only slightly above pH 4.9.

TEST EXAMPLE 2 (Test on optimum protein concentration)

Wheys containing proteins at various concentrations were prepared by admixing a whey protein isolate (hereinafter referred to as "WPI") having a protein content of 93.25% with a powder of the permeate obtained by ultrafiltration of rennet whey (hereinafter referred to as "ultrafiltrated rennet whey permeate powder). The behavior of adsorption of the proteins was examined by the batch method as in Test Example 1 (at pH 4.5). The amount of the ultrafiltrated rennet whey permeate powder added thereto was fixed at 5%.

Figure 2:
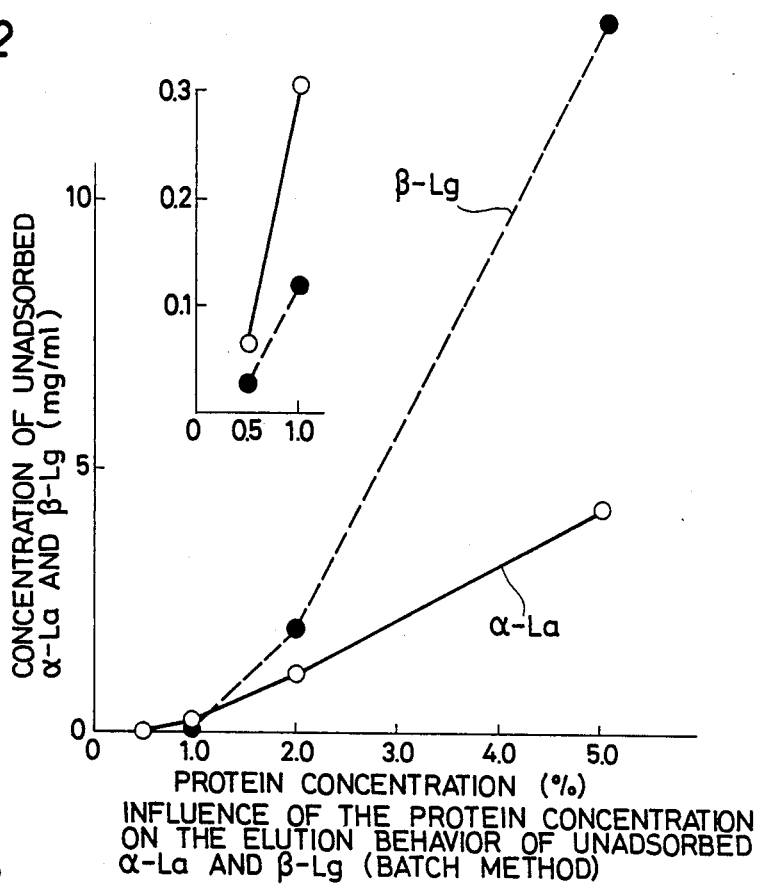
FIG. 2 is a graph showing the quantities of unadsorbed α-La and β-Lg in the protein concentration range of from 0 to 5.0% by weight in Test Example 2.
Figure 3:
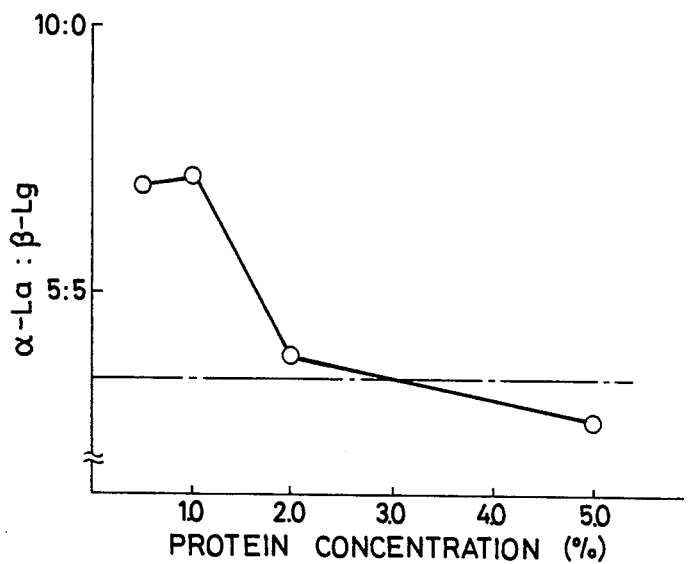
FIG. 3 is a graph showing the ratio or unadsorbed α-La and β-Lg in the protein concentration range of from 0 to 5.0% by weight in Test Example 2.

The amounts of unadsorbed $\alpha$-La and $\beta$-Lg increase monotonously with an increase in the concentration of proteins contained in the samples. Results obtained are shown in FIG. 2. The ratio $\alpha$-La:$\beta$-Lg decreased sharply when the protein concentration exceeded 1%, the protein concentration meaning the total concentration of the proteins contained in the whey prepared. The ratio of unadsorbed $\alpha$-La to unadsorbed $\beta$-Lg was reached to the maximum in the protein concentration range of from 0.5 to 1.0%, in which the ratio $\alpha$-La:$\beta$-Lg was from 75:25 to 78:22. In FIG. 3 is shown a curve that indicates the results of this test. Similar results were obtained when SPC (Indion SP manufactured by Phoenix Chemicals, New Zealand; SPC in Test Example 5 was the same product) was employed.

TEST EXAMPLE 3 (Test on the influence of concentration of minerals)

There were prepared 20 ml each of WPI solutions having a protein concentration of 1% and containing from 0 to 5% of the ultrafiltrated rennet whey permeate powder, and the solutions were subjected to the same batch treatment as in Test Example 1 to examine the behavior of elution of the proteins, i.e., $\alpha$-La and $\beta$-Lg, (at pH 4.5%).

The amounts of unadsorbed $\alpha$-La and $\beta$-Lg increased with an increase in the amount of the ultrafiltrated rennet whey permeate powder added. The ratio $\alpha$-La:$\beta$-Lg reached to the maximum when the permeate powder was added in the range of concentration of from 1 to 2%. In other words, the ratio $\alpha$-La:$\beta$-Lg had the maximum value in the ash content range of from 0.096 to 0.182%. When the ultrafiltrated rennet whey permeate powder was added at concentrations less than 1%, both $\alpha$-La and $\beta$-Lg were equally adsorbed, and the ratio of $\alpha$-La to $\beta$-Lg decreased.

Figure 4:
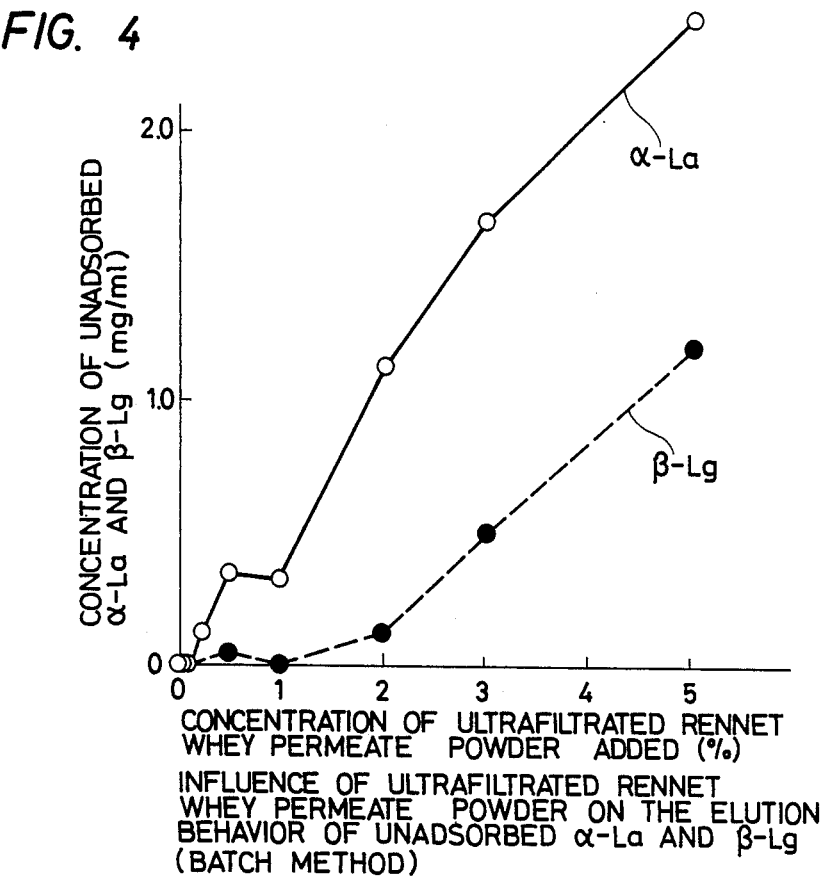
FIG. 4 is a graph showing the amounts of unadsorbed α-La and β-Lg in Test Example 3, wherein the powder of the permeate obtained by ultrafiltration of rennet whey was added in several concentrations of from 0 to 5% by weight.
Figure 5:
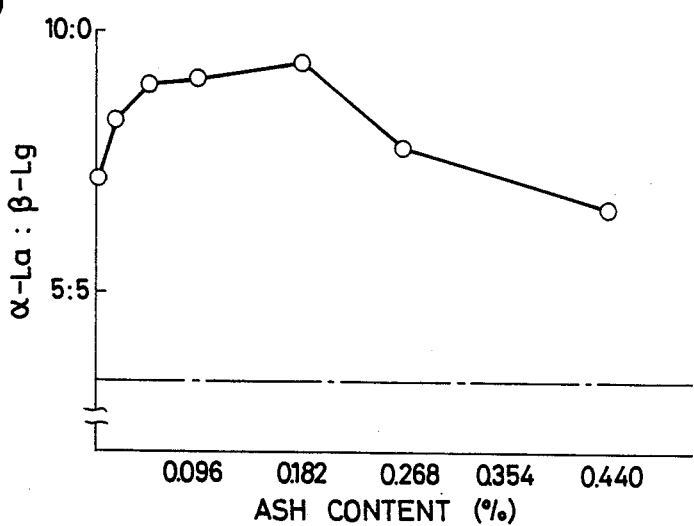
FIG. 5 is a graph showing the ratio of unadsorbed α-La and β-Lg in the ash content range of from 0 to 0.440% by weight, the ash contents corresponding to the amounts added of the ultrafiltrated rennet whey permeate powder in Test Example 3.

The influence of the addition of the ultrafiltrated rennet whey permeate powder on the adsorption of $\alpha$-La and $\beta$-Lg (batch method) is shown in FIG. 4, and the relationship between the ratio $\alpha$-La:$\beta$-Lg and the ash content (%) corresponding to the quantity of the ultrafiltrated rennet whey permeate powder added is shown in FIG. 5.

TEST EXAMPLE 4 (Test on the influence of ultrafiltration)

Into each of glass columns having a diameter of 43 mm and a height of 180 mm was charged 100 ml of throughly washed CMC. After the charging, the pH value of the CMC was adjusted to 4.5 with 6N HCl.

Into the columns were supplied, respectively, (i) rennet whey, (ii) a two-fold concentrated rennet whey prepared by ultrafiltrating rennet whey (hereinafter referred to as "ultrafiltrated two-fold concentrated rennet whey") the two-fold concentration meaning that the volume of the retentate (concentrate) obtained by the ultrafiltration is half of its original volume, and (iii) a reduced whey prepared by diluting the ultrafiltrated two-fold concentrated rennet whey with an equal amount of water (hereinafter referred to as "ultrafiltrated two-fold concentrated reduced rennet whey").

In the case of the ultrafiltrated two-fold concentrated rennet whey (which had a protein concentration of 1.52% in spite of the fact that it had an ash content almost at the same level as that before the concentration), the elution of unadsorbed $\beta$-Lg started earlier than in the case of the rennet whey, and the whey amount used and the separation ability became smaller.

On the other hand, in the case of the ultrafiltrated two-fold concentrated reduced rennet whey, the beginning of the elution of unadsorbed α-La and β-Lg was later than in the case of the rennet whey, and the ratio of unadsorbed α-La to unadsorbed β-Lg was greater than in the case of the rennet whey. These results can be attributed to the demineralization.

In FIG. 6 are shown the elution curves of unadsorbed α-La and β-Lg in the case where the rennet whey was passed through the column. The relative protein concentration (%) in eluate shown in the ordinate of FIG. 6 indicates the ratio in percentage of each concentration of the proteins (i.e., α-La and β-Lg) contained in the eluate to that of the same proteins contained in the rennet whey to be applied to the column. This definition is applied similarly to FIGS. 7 to 11; for example, in the case of FIG. 7 the ultrafiltrated two-fold concentrated rennet whey to be applied to the column corresponds to said rennet whey.

In FIG. 7 are shown the elution curves of unadsorbed α-La and β-Lg in the case where the ultrafiltrated two-fold concentrated rennet whey was passed through the column.

In FIG. 8 are shown the elution curves of unadsorbed α-La and β-Lg in the case where the ultrafiltrated two-fold concentrated reduced rennet whey was passed through the column.

TEST EXAMPLE 5 (Test on the influence of electrodialysis)

Goada cheese wheys were subjected to a similar test as in Test Example 4.

When a Goada cheese whey (pH 4.5) was applied to the column, β-Lg unadsorbed was eluted in large quantities at around the eluate volume of 500 ml, and the separation could not be effected sufficiently. On the other hand, in the case of a Goada cheese whey demineralized by 92% by using ion exchange resins (SKI-B and SA 20A-P manufactured by Mitsubishi Kasei Corp., hereinafter referred to as "92% demineralized Goada cheese whey"), both α-La and β-Lg were adsorbed, and the ratio of unadsorbed αLa to unadsorbed β-Lg contained in the eluate was not so much different from that of α-La to β-Lg contained in the original 92% demineralized Goada cheese whey, that is to say, no substantial separation could be effected.

In the case of a Goada cheese whey demineralized by 70% by means of electrodialysis (hereinafter referred to as "70% demineralized Goada cheese whey"), β-Lg was selectively adsorbed, and the ratio of unadsorbed α-La to unadsorbed β-Lg contained in the eluate markedly increased in comparison with that of α-La to β-Lg in the original 70% demineralized Goada cheese whey. The concentration of unadsorbed β-Lg started to increase when the eluate volume reached to ca. 3,000 ml. This is presumably because the cation exchange groups contained in the CMC were saturated with the adsorbed β-Lg. The ratio α-La:β-Lg in 4,000 ml of eluate was 7.5:1.

Figure 9:
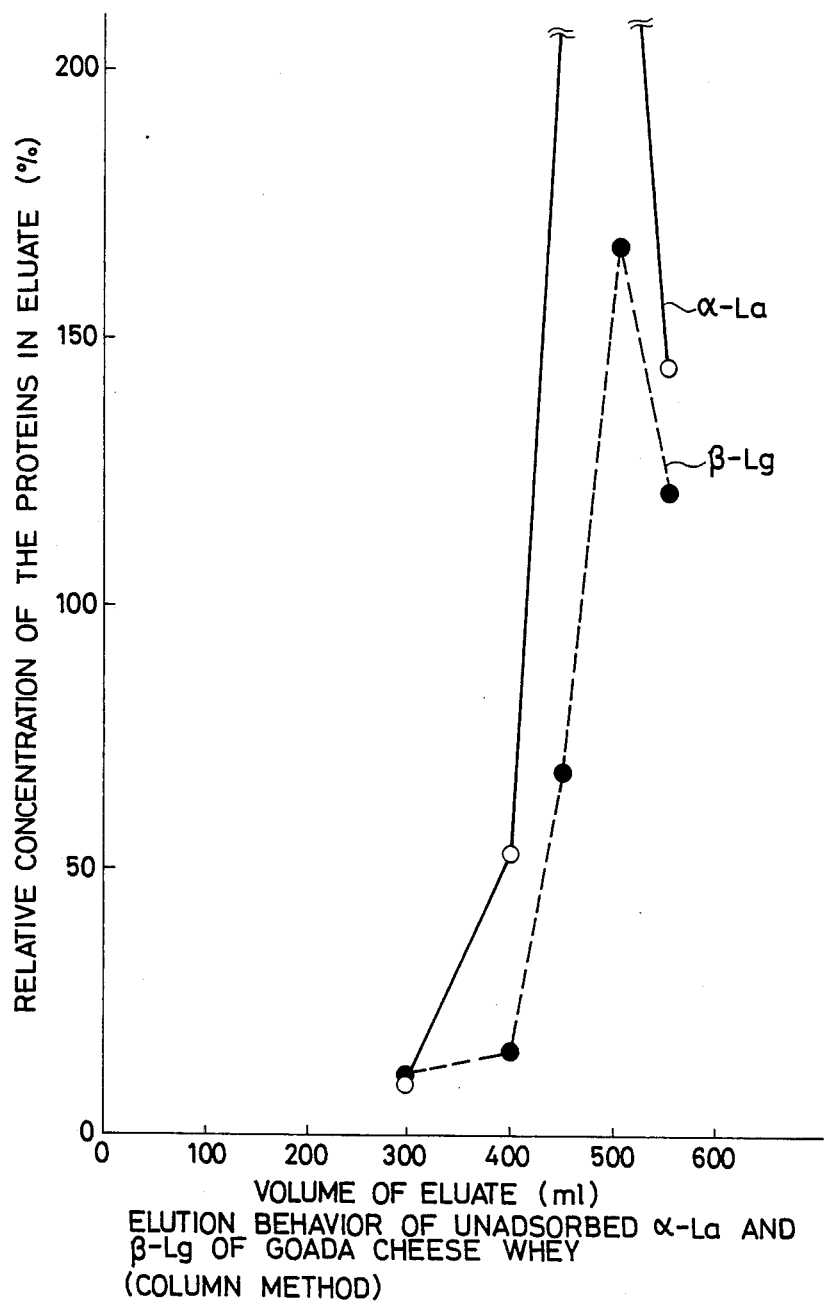
FIG. 9 is a graph showing the elution behavior of unadsorbed α-La and β-Lg of a Goada cheese whey in Test Example 5.

In FIG. 9 is shown the elution behavior of unadsorbed α-La and β-Lg in the Goada cheese whey (by the column method). In FIG. 10 is shown the elution behavior of unadsorbed α-La and β-Lg in the 92% demineralized Goada cheese whey (by the column method). In FIG 11 is shown the elution behavior of unadsorbed α-La and β-Lg in the 70% demineralized Goada cheese whey (by the column method).

On the basis of the results in the above tests, there was obtained the finding that milk whey must be treated so as to have a pH value of from 4.3 to 4.6, a demineralization rate of 60 to 90%, preferably from 70 to 80%, and a protein concentration of from 0.5 to 1.5%, preferably from 0.5 to 1.0%, and then brought into contact with CMC, in order to effectively remove β-Lg from the milk whey. Substantially the same results were obtained in cases where several types of SPC were used.

EXAMPLE

Into a vinyl chloride column having a diameter of 45 cm and a height of 50 cm (manufactured by Shoei Seisakusho Co., Ltd.) was charged 17 liters of CMC, and the pH value was adjusted, while being stirred, to 4.5 with 6N HCl. Thereafter, the 70% demineralized Goada cheese whey whose pH value has been adjusted to 4.5 with 6N HCl was passed through the column at a rate of from 25 to 30 l/hr.

After 660 kg of the whey had been passed through the column, the CMC was washed with 80 liters of water. After the washing, the pH value of the CMC was adjusted, while being stirred, to 8.5 with 6N NaOH, for eluting the whey proteins adsorbed on the CMC. Thereafter, 80 liters of water was passed through the column to recover the adsorbed proteins.

The 70% demineralized Goada cheese whey, the first eluate containing unadsorbed α-La and β-Lg, and the second eluate (alkaline) had the respective compositions as shown in Table 3.

In the first eluate, the ratio α-La:β-Lg was 3.34:1, and contents of immunoglobulins and non-protein nitrogens remained almost unchanged.

The alkaline eluate containing desorbed β-Lg, etc contained very small quantities of serum albumin and α-La. However, almost no immunoglobulins and non-protein nitrogens were contained therein.

TABLE 3

| Compositions of Whey and Eluates | | | |
|---|---|---|---|
| | 70% Demineralized Goada Cheese Whey | Mixture of Fraction Nos. 1–35 (694 kg) of the First Eluate | Mixture of Fraction Nos. 39–42 (80 kg) of the Second Eluate (Freeze-Dried) |
| Protein (%) | 0.63 | 0.38 | 87.53 |
| Total Solid Content (%) | 6.11 | 5.30 | 96.62 |
| Ash (%) | 0.22 | 0.19 | 2.90 |
| Fat (%) | — | 0.046 | 2.60 |
| CHO (%) | — | 4.94 | 3.59 |
| Na (mg %) | 21 | 15 | 870 |
| K (mg %) | 37 | 26 | 100 |
| Ca (mg %) | 22 | 14 | 108 |
| Mg (mg %) | 7 | 5 | 33 |
| Cl (mg %) | 52 | 48 | 515 |
| P (mg %) | — | — | 84 |
| α-La:β-Lg | 1.00:2.80 | 3.34:1.00 | 1.00:7.78 |

What is claimed is:

1. A method of removing beta-lactoglobulin from bovine milk whey, comprising the steps of:
   providing a milk whey which has been demineralized by 60 to 90% by weight, said milk whey containing beta-lactoglobulin and having a pH value of from 4.3 to 4.6 and a protein concentration of from 0.5 to 1.5% by weight; and
   contacting said milk whey with a cation exchange cellulose, thereby absorbing said beta-lactoglobulin of said milk whey on the cation exchange cellulose.

2. A method for removing beta-lactoglobulin from a beta-lactoglobulin-containing bovine milk whey, comprising the steps of:
(1) (a) adjusting the pH of the milk whey to from 4.3 to 4.6,
(b) demineralizing the milk whey by from 60 to 90% by weight,
(c) adjusting the protein concentration of said milk whey to from 0.5 to 1.5; then
(2) contacting the milk whey adjusted according to steps (1)(a)–(1)(c) with a cation exchange resin, thereby absorbing the beta-lactoglobulin of said adjusted milk whey on the cation exchange cellulose.

3. A method for removing β-lactoglobulin as defined in claim 2, wherein said bovine milk whey is at least one selected from the group consisting of sweet wheys, acid wheys, whey powders, and whey protein concentrates, the whey powders and whey protein concentrates having been prepared from the sweet wheys or acid wheys.

4. A method for removing β-lactoglobulin as defined in claim 2, wherein β-lactoglobulin adsorbed on the cation exchange cellulose by said contact is eluted with an alkaline solution.

* * * * *